No. 790,960. PATENTED MAY 30, 1905.
E. J. HODGSON.
SPEED INDICATOR.
APPLICATION FILED DEC. 21, 1903.
3 SHEETS—SHEET 1.
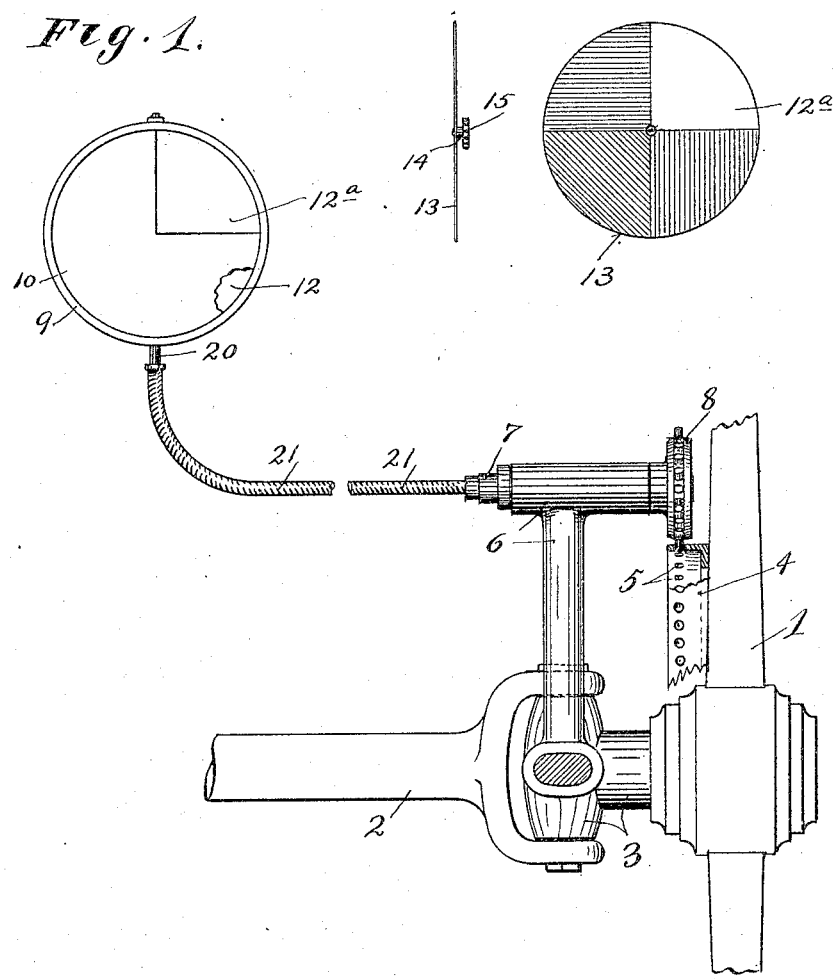
Witnesses.
A. H. Opsahl.
H. D. Kilgore
Inventor.
E. J. Hodgson.
By his Attorneys
Williamson & Merchant

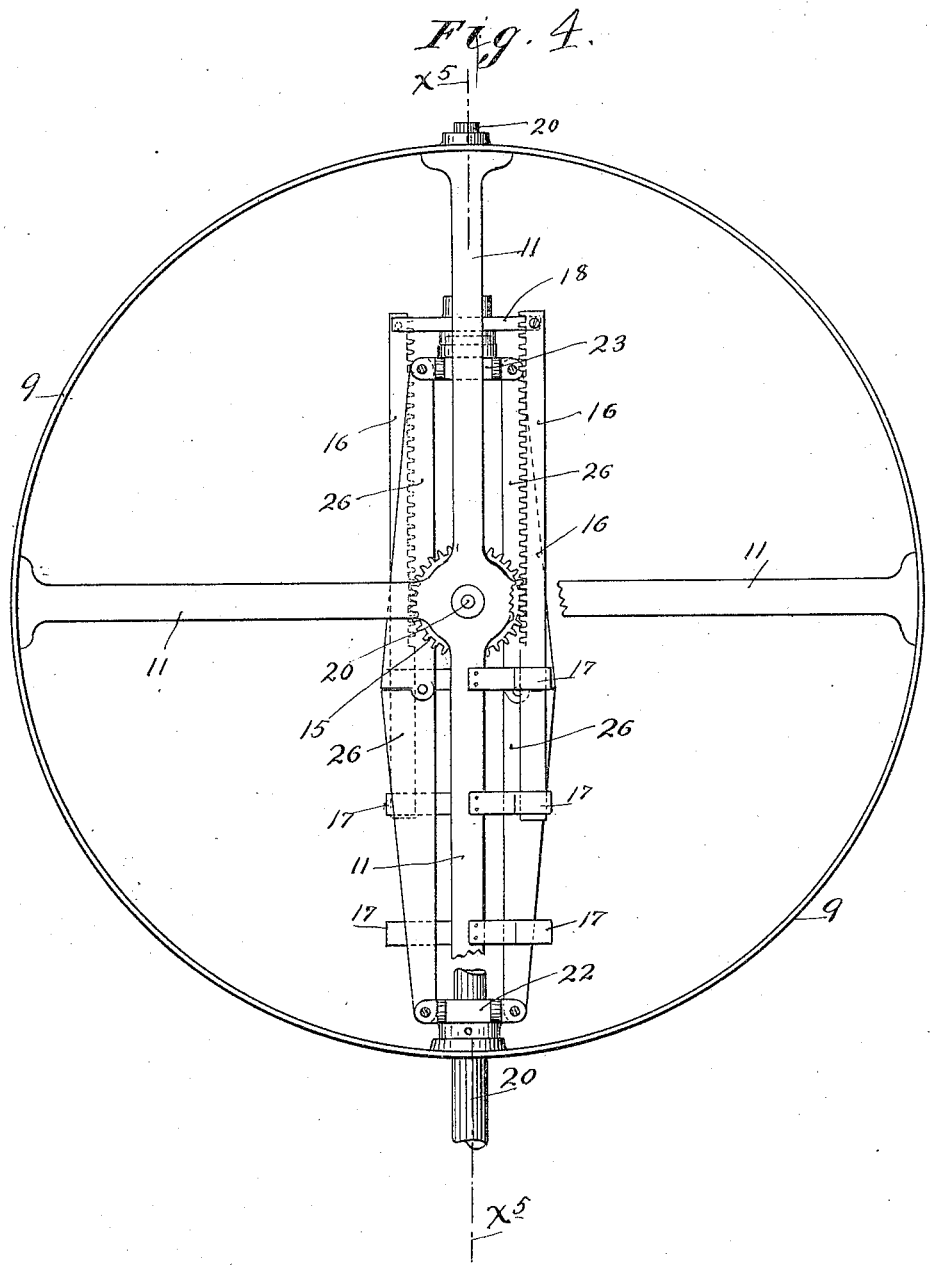

No. 790,960. PATENTED MAY 30, 1905.
E. J. HODGSON.
SPEED INDICATOR.
APPLICATION FILED DEC. 21, 1903.

3 SHEETS—SHEET 3.

Witnesses.
A. H. Opsahl.

Inventor.
E. J. Hodgson.
By his Attorneys.
Williamson & Merchant

No. 790,960.

Patented May 30, 1905.

UNITED STATES PATENT OFFICE.

EDGAR J. HODGSON, OF MINNEAPOLIS, MINNESOTA.

SPEED-INDICATOR.

SPECIFICATION forming part of Letters Patent No. 790,960, dated May 30, 1905.

Application filed December 21, 1903. Serial No. 185,941.

*To all whom it may concern:*

Be it known that I, EDGAR J. HODGSON, a citizen of the United States, residing at Minneapolis, in the county of Hennepin and State of Minnesota, have invented certain new and useful Improvements in Speed-Indicators; and I do hereby declare the following to be a full, clear, and exact description of the invention, such as will enable others skilled in the art to which it appertains to make and use the same.

My present invention relates to speed-indicators, and has for its especial object to provide a simple, convenient, and reliable indicator for indicating to persons along the line of travel, as well as to the occupants of the vehicle, the speed, or approximately the speed, at which the vehicle is traveling.

Further stated, it is the object of my invention also to provide an indicator of the above character which does not require to be observed closely or very accurately in order to determine the approximate speed of the vehicle. This feature is desirable in order to enable persons along the line of travel to note the speed indication of the indicator even when the vehicle is running at a very high rate of speed.

To the above ends the invention consists of the novel devices and combinations of devices hereinafter described, and defined in the claims.

Figure 5:
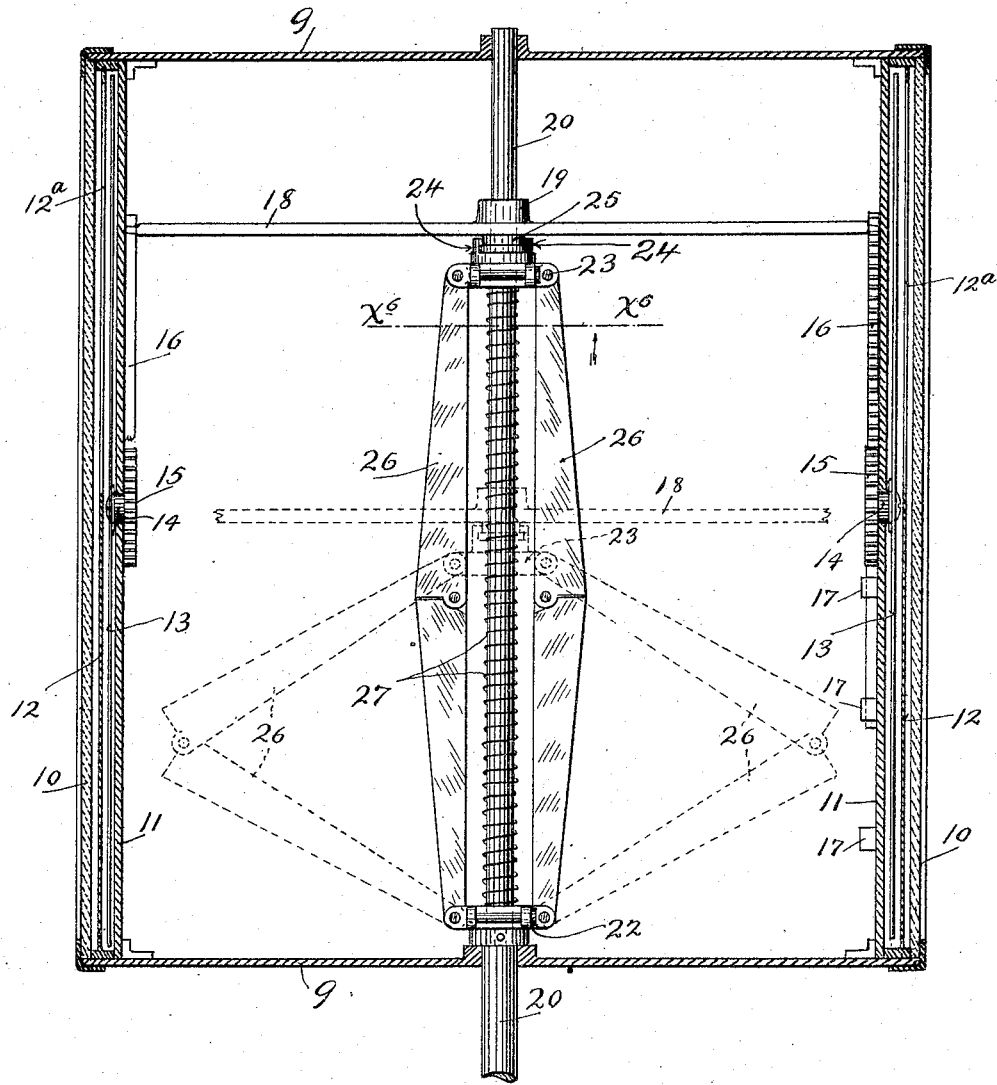
Figure 6:
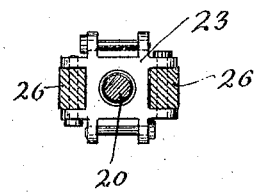

The invention is illustrated in the accompanying drawings, wherein like characters indicate like parts throughout the several views.
Figure 1 is a view, partly in diagram and partly in elevation and with some parts broken away, illustrating the manner in which my improved speed-indicator is applied to a vehicle. Fig. 2 is a detail in face elevation, showing the so-called "indicator-disk" removed from working position. Fig. 3 is an end elevation of the said disk shown in Fig. 2. Fig. 4 is a face elevation of the indicator proper with certain parts removed. Fig. 5 is a longitudinal section through the indicator approximately on the line $x^5$ $x^5$ of Fig. 4, and Fig. 6 is a detail in section on the line $x^6$ $x^6$ of Fig. 5.

The numeral 1 indicates one of the front wheels of a vehicle, such as an automobile.

The numeral 2 indicates the front axle of the vehicle, the said axle having at its ends pivoted trunnions 3, only one of which is shown in the drawings. The front wheels of the vehicle are, as is usual, mounted on the said pivoted axle-trunnions, and the machine will of course be steered in the usual way by pivotal movements of the said axle-trunnions.

I desire to drive my improved speed-indicator from one of the front wheels of a vehicle, and hence the said wheel is provided with a suitable driving-gear, shown as afforded by an annular flange 4, rigidly secured to said wheel, concentric to its axis and having a plurality of peripherally-spaced pin-seats 5. In a standard 6, rigidly secured to and movable with the axle-trunnion 3, is loosely journaled a short shaft 7, carrying at one end a pin-wheel or gear 8, the projecting pins of which work in the seats 5 of the annular flange 4, the said parts 4 and 8 coöperating much in the manner of a pair of bevel-gears. The indicator proper may be supported from any suitable part of the vehicle-body or elsewhere, but would preferably be supported by the forward portion of said body in position where it can be readily seen by persons along the line of travel. Furthermore, in order that the indication of the speed of the vehicle may be read from either side of the same the indicator is preferably provided on its opposite faces with duplicate speed-indicating devices.

The case of the indicator proper is preferably in the form of a cylindrical shell 9, having at each end a glass disk or crystal 10 and a metallic bearing-spider 11, the latter being spaced slightly inward of the former. In the spaces between the parts 10 and 11 and parallel therewith are secured thin metal dials 12, having cut therefrom at $12^a$ segments of approximately ninety degrees. Working within the spaces between the dials 12 and bearing spiders 11 are rotating indicator-disks 13, which are carried by short trunnions 14, journaled in said spiders 11 at the axes thereof and provided at their inner ends with spur-pinions 15. These spur-pinions 15 mesh with racks 16, that are mounted in suitable keeper-guides 17, secured on the legs of the spider-brackets 11. The racks 16 engage their respective pinions 15 on opposite sides thereof, so that when the two racks are moved together in a given direction the two pinions and their connected indicator-disks will be rotated in reverse directions from each other. The upper ends of the two racks 16 are tied together by a transverse bar 18, having a hub 19, which slides on a shaft 20, suitably journaled in the upper and lower portions of the shell 9, with its lower end depending therethrough and connected to the driving-shaft 7 by a flexible shaft 21. The shaft 20 of course rotates freely in its bearings on the shell 9 and in the hub 19 of the tie-bar 18. The rotating shaft 20 carries a pair of hinge-heads 22 and 23, the former of which is fixed thereto and the latter of which rotates with, but slides upon, the same. The sliding head 23 has shipper-lugs 24, that engage an annular groove 25 in the hub of the tie-bar 18 in such manner that said bar will be moved, with said head 23, axially of the shaft 20, but will not be caused to rotate therewith. A plurality of toggle-acting bars 26 connect the two so-called "hinge-heads" 22 and 23. A spring 27 on the shaft 20, compressed between the heads 22 and 23, tends to separate them and normally hold the toggle-bars 26 straightened out, as shown by full lines in Fig. 5.

On its face each indicator-disk 13 is marked with segments of different color. For instance, as illustrated in Fig. 2, the said disk is divided into four segments, one segment being white, another red, another green, and another blue. Either one or the other of these colored segments and sometimes a portion of two thereof, depending on the speed of the vehicle, will be exposed to view through the removable segment $12^a$ of the dial 12. For instance, the arrangement may be assumed to be such that when the white segment is alined with the removed segment or sight-opening $12^a$, the vehicle standing still, that the blue segment will be alined with said sight-opening when the vehicle exceeds a speed of ten miles per hour, that the green segment will be alined with said sight-opening when the vehicle is running at a speed of twenty miles per hour, and that the red segment will be alined with said sight-opening when the speed of the vehicle reaches or exceeds thirty miles per hour.

As is evident, the above-described indicating means does not require to be observed very closely to enable a person to determine at least the approximate speed at which the vehicle is running. This is an important feature in an indicator which is intended to notify persons other than those within the vehicle of the speed at which the vehicle is running. An indicator of this character is especially intended to assist officers of the law in enforcing ordinances limiting the speed of automobiles.

As is evident, the required movements will be imparted to the marked indicator-disks 13 by movements of the toggle-bars 26 under the combined action of centrifugal force and of the spring 27. The tension of the spring 27 should of course be so regulated with respect to the weight of the toggle-bars 26 that the proper movements of the said toggle-bars and connected parts will take place under different speeds of travel of the vehicle. One extreme position of the toggle-bars 26 is indicated by full lines and another by dotted lines in Fig. 5.

The flexible shaft 21 permits the application of the indicator proper to the body of the vehicle and of the driving-gears to parts which move with respect thereto.

From what has been said it will of course be understood that the device described is capable of modification within the scope of my invention as herein set forth and claimed. Instead of employing the metallic dials 12, with segmental notches $12^a$, the crystals or glass disks 10 might be coated with paint or other opaque material and be left with transparent segments corresponding to the sight-openings $12^a$.

What I claim, and desire to secure by Letters Patent of the United States, is as follows:

1. In an indicator of the character described, the combination with a case having a sight-opening at each side, of an indicator-disk cooperating with each sight-opening, each disk having a gear rotatable therewith, sliding racks engaging said two gears, a bar connecting said racks for simultaneous movements, a shaft having connections for driving it from one of the wheels of the vehicle, toggle-like centrifugally-actuated bars carried by said shaft, a spring tending to hold said bars straightened out, and a coupling uniting the sliding ends of said toggle-bars with the rack-connecting bar but permitting the said toggle-bars to rotate with respect thereto, substantially as described.

2. The combination with a vehicle-axle having a pivoted trunnion and a wheel mounted on said trunnion, of a pair of driving-gears, the one carried by said wheel and the other mounted in a support carried by said trunnion, a flexible shaft driven from said latter gear member, and a speed-indicator proper driven from said flexible shaft and adapted to be supported by a part of the vehicle, such as the body thereof, substantially as described.

In testimony whereof I affix my signature in presence of two witnesses.

EDGAR J. HODGSON.

Witnesses:
E. H. KELIHER,
F. D. MERCHANT.